US008014794B2

(12) United States Patent
Huh et al.

(10) Patent No.: US 8,014,794 B2
(45) Date of Patent: Sep. 6, 2011

(54) MOBILE TERMINAL AND SCHEDULE MANAGEMENT METHOD USING THE SAME

(75) Inventors: Jae Young Huh, Seoul (KR); Jea Hyuck Lee, Anyang-si (KR); Shin Hee Cho, Suwon-si (KR); Ji Hyun Jung, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 959 days.

(21) Appl. No.: 11/986,123

(22) Filed: Nov. 20, 2007

(65) Prior Publication Data
US 2008/0139245 A1    Jun. 12, 2008

(30) Foreign Application Priority Data
Dec. 7, 2006    (KR) .................. 10-2006-0123548

(51) Int. Cl.
*H04W 88/02* (2009.01)
(52) U.S. Cl. .................................. 455/456.3
(58) Field of Classification Search ............ 455/456.3, 455/412.1, 414.1, 418, 442, 461, 566, 556.2; 370/252, 329, 345; 715/710
See application file for complete search history.

(56) References Cited

U.S. PATENT DOCUMENTS

| | | | | | |
|---|---|---|---|---|---|
| 5,790,974 | A | * | 8/1998 | Tognazzini | 455/456.5 |
| 6,687,495 | B2 | * | 2/2004 | Bhatia et al. | 455/414.1 |
| 6,937,869 | B1 | * | 8/2005 | Rayburn | 455/457 |
| 2003/0087649 | A1 | * | 5/2003 | Bhatia et al. | 455/456.1 |
| 2005/0021227 | A1 | * | 1/2005 | Matsumoto et al. | 701/207 |
| 2007/0077944 | A1 | * | 4/2007 | Bellenger et al. | 455/456.1 |

FOREIGN PATENT DOCUMENTS

| KR | 2006-7280 | 1/2006 |
|---|---|---|
| KR | 2006-32003 | 4/2006 |
| KR | 2006-122620 | 11/2006 |

* cited by examiner

*Primary Examiner* — Diane Mizrahi
(74) *Attorney, Agent, or Firm* — Cha & Reiter, LLC

(57) ABSTRACT

A mobile terminal and schedule management method using the same. The method includes: setting a schedule, the schedule including an alarm time, planned event time, planned event and a destination; and information about the location of the scheduled destination from a map search feature. A current location of the mobile terminal can be computed at an alarm time of a current schedule, using global positioning system (GPS) satellite signals. A first estimated travel time from the current location of the mobile terminal to a destination of the current schedule is provided. An alarm is output in which at least the computed first estimated travel time and the current schedule are displayed. The schedule management function integrates location and traffic information to provide effective schedule guidance to a user.

19 Claims, 6 Drawing Sheets

MOBILE TERMINAL AND SCHEDULE MANAGEMENT METHOD USING THE SAME

CLAIM OF PRIORITY

This application claims priority from an application entitled "MOBILE TERMINAL AND SCHEDULE MANAGEMENT METHOD USING THE SAME," filed in the Korean Intellectual Property Office on Dec. 7, 2006 and assigned Serial No. 2006-0123548, the contents of which are incorporated herein by reference in its entirety.

BACKGROUND OF THE INVENTION

1. Field of the Invention

The present invention relates generally to a mobile terminal. More particularly, the present invention relates to a mobile terminal which provides a scheduling function and a schedule management method providing schedule functioning.

2. Description of the Related Art

With advances in mobile communication technologies, a mobile user can readily carry a mobile terminal in order to send and receive phone calls at most times and places. In addition to conventional call processing, advanced mobile terminals can provide various support functions such as schedule management, text message and image transmission, audio and music file playing, and gaming.

For example, the schedule management function of a mobile terminal helps the user to plan, change, and check schedules, and can even remind the user of a planned event by sounding an alert at a preset alarm time at a predetermined or programmed time before the actual planned event.

However, a conventional schedule management function, particularly those in mobile terminals, which acts primarily as a schedule reminder, is insufficient to provide the user with effective schedule management.

SUMMARY OF THE INVENTION

The present invention has been made in view of the above problems, and the present invention provides a mobile terminal and enhanced schedule management method using the same, wherein user schedules are supplemented with location and traffic information to provide an effective schedule management function for the user.

In accordance with an embodiment of the present invention, there is provided a schedule management method using a mobile terminal, including the steps of: setting a schedule, the schedule including an alarm time, a planned event time, a planned event and a destination; receiving location information of a destination of a schedule through a map search feature; computing, at an alarm time of a current schedule, the current location of the mobile terminal using global positioning system (GPS) satellite signals; computing a first estimated travel time from the current location of the mobile terminal to a destination of the current schedule; and outputting an alarm, and displaying the computed first estimated travel time and the current schedule.

In accordance with another embodiment of the present invention, there is provided a schedule management method for use with devices such as a mobile terminal, including: setting a schedule, the schedule including an alarm time, a planned event time, a planned event and a destination; receiving location information of a destination of a schedule through a map search feature; determining, at an alarm time of a current schedule, whether a preceding schedule is pending between the alarm time and a planned event time of the current schedule; computing, if a preceding schedule is pending, an estimated travel time from a destination of the preceding schedule to a destination of the current schedule; and outputting an alarm, and displaying the computed estimated travel time and the current schedule.

In accordance with yet another exemplary embodiment of the present invention, there is provided a mobile terminal including: a key input unit for inputting a schedule including an alarm time, a planned event time, a planned event, a destination, and transportation means; a wireless unit for receiving location information of a scheduled destination through a map search feature; a global positioning system (GPS) module for receiving GPS satellite signals to compute a current location of the mobile terminal at an alarm time associated with a current schedule; a control unit for computing a first estimated travel time from the current location of the mobile terminal to a destination of a currently scheduled event; a display unit for displaying the computed first estimated travel time and the current schedule; and an alarm unit for producing an alarm at a specified alarm time in accordance with the schedule.

Preferably, the control unit computes, if a preceding schedule is pending between the alarm time and a planned event time of the current schedule, a second estimated travel time from a destination of the preceding schedule to the destination of the current schedule, and displays the computed second estimated travel time and the current schedule, in part to provide the user with an estimate in order to prioritize time management.

Preferably, the control unit repeatedly computes a tentative estimated travel time between a current location of the mobile terminal and the destination of the current schedule at regular time intervals from the alarm time to the planned event time of the current schedule, and outputs, if the tentative estimated travel time is greater than the difference between the first or second estimated travel time and a preset time duration, an alarm to the alarm unit, so the user is aware that he might be late to a subsequent appointment.

Preferably, according to the present invention, the control unit receives and displays a guide image of the destination of the current schedule at a preset time before the planned event time of the current schedule.

Preferably, according to the present invention, the first estimated travel time and second estimated travel time are a time value obtained through dividing a distance between the current location of the mobile terminal and the destination of the current schedule by an average speed of a transportation means for the current schedule.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Figure 1:
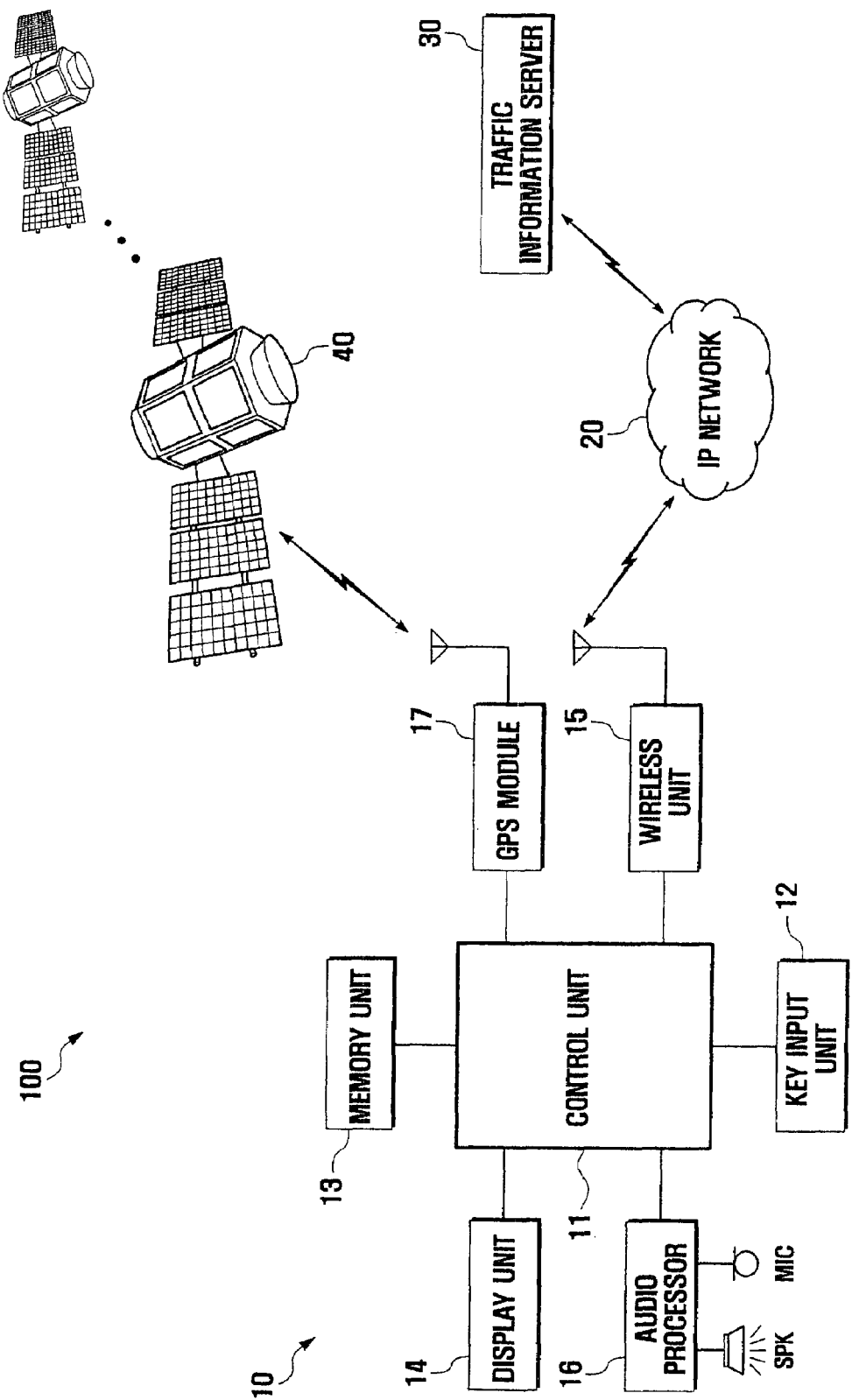
FIG. 1 illustrates an exemplary embodiment of a schedule management system including a mobile terminal according to the present invention.

Hereinafter, embodiments of the present invention are described in detail with reference to the accompanying drawings. It should be understood that the drawings and text of exemplary embodiments of the mobile terminal and schedule management method have been provided herein for purposes of illustration and do not limit the claimed invention to the embodiments shown and described. The same reference symbols identify the same or corresponding elements in the drawings. Detailed descriptions of constructions or processes known in the art may be omitted to avoid obscuring the invention with unnecessary detail.

FIG. 1 illustrates a schedule management system including a mobile terminal according to an exemplary embodiment of the present invention.

Referring to FIG. 1, the schedule management system 100 includes a mobile terminal 10 typically comprised of units 11-17, a traffic information server 30, and a plurality of global positioning system (GPS) satellites 40.

The mobile terminal 10 performs a schedule management function for the user. The mobile terminal is adapted for to receive an input of one or more necessary schedules using the schedule management function in order to set at least a first schedule.

The traffic information server 30 is in communication with (typically a form of wireless communication but not limited thereto) to the mobile terminal 10 through an Internet protocol (IP) network 20. The traffic information server 30 provides to the mobile terminal 10 destination information through a map search feature, which may include distance data between the current location of the mobile terminal 10 and the destination of the current schedule, and guide images of destinations upon request.

The plurality of GPS satellites 40 may communicate with the mobile terminal to provide GPS signals to the mobile terminal 10 for computing the location of the mobile terminal 10.

In particular, as shown in FIG. 1, the mobile terminal 10 typically includes a control unit 11, key input unit 12, memory unit 13, display unit 14, wireless unit 15, audio processor 16, and GPS module 17.

The control unit 11 functions to control the overall operation of the mobile terminal 10 which includes control of schedule management.

The key input unit 12 includes a plurality of keys for manipulating the mobile terminal 10, and sends key values of keys selected by the user to the control unit 11. Of course, it should be understood that the input unit may comprise input units such as, for example, a touch screen without physical buttons, or even an optical character recognition (OCR) tablet where a user could enter the information with a stylus. A touch screen or tablet could in fact also serve a display function of the display unit. Accordingly, the user inputs a schedule. It should also be noted that the term "input" may also encompass downloading a schedule from another device where it is already stored, for example, a calendar function in a personal computer, or a copy thereof from a storage device such as a thumbnail drive.

A schedule is typically comprised of an alarm time, alarm means, planned event time, planned event, destination, transportation means, and the like. Transportation means refers to the means of transportation that can be used (or is preferable to be used) by the user to reach the destination, and may include walking.

The memory unit 13 stores programs for controlling the operation of the mobile terminal 10, and data generated from execution of the programs. In particular, the memory unit 13 stores a program for schedule management, and schedule data such as location information of a destination.

The display unit 14 displays on a screen the various menus for functions executable in the mobile terminal 10, and data stored in the memory unit 13. In particular, the display unit 14 displays images for schedule management. The display unit 14 may include a panel of liquid crystal display (LCD) devices, but it should be understood that other technologies for display can be used in addition to LCD.

The wireless unit 15 modulates data from the control unit 11 into a signal to be transmitted, up-converts the frequency of the signal, and transmits the signal. The wireless unit 15 also receives a signal through an antenna, down-converts the frequency of the received signal, demodulates the received signal, and sends the demodulated signal to the control unit 11. In particular, the wireless unit 15, which under the control of the control unit 11, communicates with the traffic information server 30 through the IP network 20 to receive necessary traffic information.

Still referring to FIG. 1, the audio processor 16 receives a voice signal from a microphone (MIC), and sends the received voice signal in a digital form to the control unit 11. The audio processor 16 reproduces decoded audio data from the wireless unit 15 through a speaker (SPK), and outputs an alarm sound through the speaker SPK.

The GPS module 17 receives GPS signals from at least four GPS satellites 40 (according to this exemplary embodiment, however the number could be more or less than four), and computes the location of the mobile terminal 10 using the received GPS signals, under the control of the control unit 11.

At an alarm time of the current schedule, the control unit 11 computes a first estimated travel time from the current location of the mobile terminal 10 to the destination of the current schedule, sounds an alarm through the speaker SPK, and displays the current schedule and estimated travel time through the display unit 14. It is within the spirit of the invention and the scope of the appended claims to display estimated travel times by more than one mode of transportation, for example, by automobile, train, and/or bus.

In some congested cities, it can be faster to walk than drive, or take a bus, and the user could select alternative modes of transportation and their estimated travel times. In addition, as traffic information servers are becoming increasingly more sophisticated and sometimes receive information from roadside sensors regarding average vehicular speed at a given time, the user could select or automatically receive alternative modes of transportation that would have shorter estimated travel times, in case, for example, there is a mechanical problem with a train, or an automobile accident on a roadway.

When a preceding schedule is pending between the alarm time and the planned event time of the current schedule, the control unit 11 computes a second estimated travel time from the destination of the preceding schedule to the destination of the current schedule, and displays the second estimated travel time and the current schedule.

From the alarm time to the planned event time of the current schedule, the control unit 11 computes at regular time intervals a tentative estimated travel time from the current location of the mobile terminal 10 to the destination of the current schedule. If the tentative estimated travel time is greater than the difference between the first estimated travel time and a preset time interval, the control unit 11 sounds an alarm indicating a shortage of time through the speaker SPK.

The time interval may be set to a duration of 5 to 20 minutes, and is set to a ten-minute duration in the description. The time interval may be narrowed with the passage of time, so as the planned event time becomes closer to the current time, the alarm could be activated at increasingly shorter intervals. It should be understood by a person of ordinary skill in the art that while the range of 5 to 20 minutes is a preferred method of practicing the invention, it is within the spirit and scope of the claimed invention to increase, decrease, or shift the breadth of the time interval.

When the current time has reached the planned event time of the preceding schedule, the control unit 11 displays the second estimated travel time and the current schedule.

When the current time has reached a preset time before the planned event time of the current schedule, the control unit 11 receives and displays a guide image of the destination of the current schedule. In this example, the preset time may correspond to 5 to 20 minutes before the planned event time and is preferably set to 10 minutes before the planned event time in the description.

It should also be understood by a person of ordinary skill in the art that the speaker SPK is but one way that the user could be notified of an alarm condition. Instead of, or in addition to, a speaker, there can be a buzzer (such as formed by a piezo-electric/electro-restrictive device), or the display screen could flash, or the mobile terminal could notify the user in a same or similar way as an incoming call or text message, wherein there would be an indication about the planned event. Also, in particular, the alarm issued can be in the form of voice sounds using the speaker SPK, light using a separate light emitting device, or vibration using a motor, and/or possibly any combination thereof.

Accordingly, the mobile terminal 10 provides a schedule management function integrated with location and traffic information to the user for effective schedule guidance.

Figure 2:
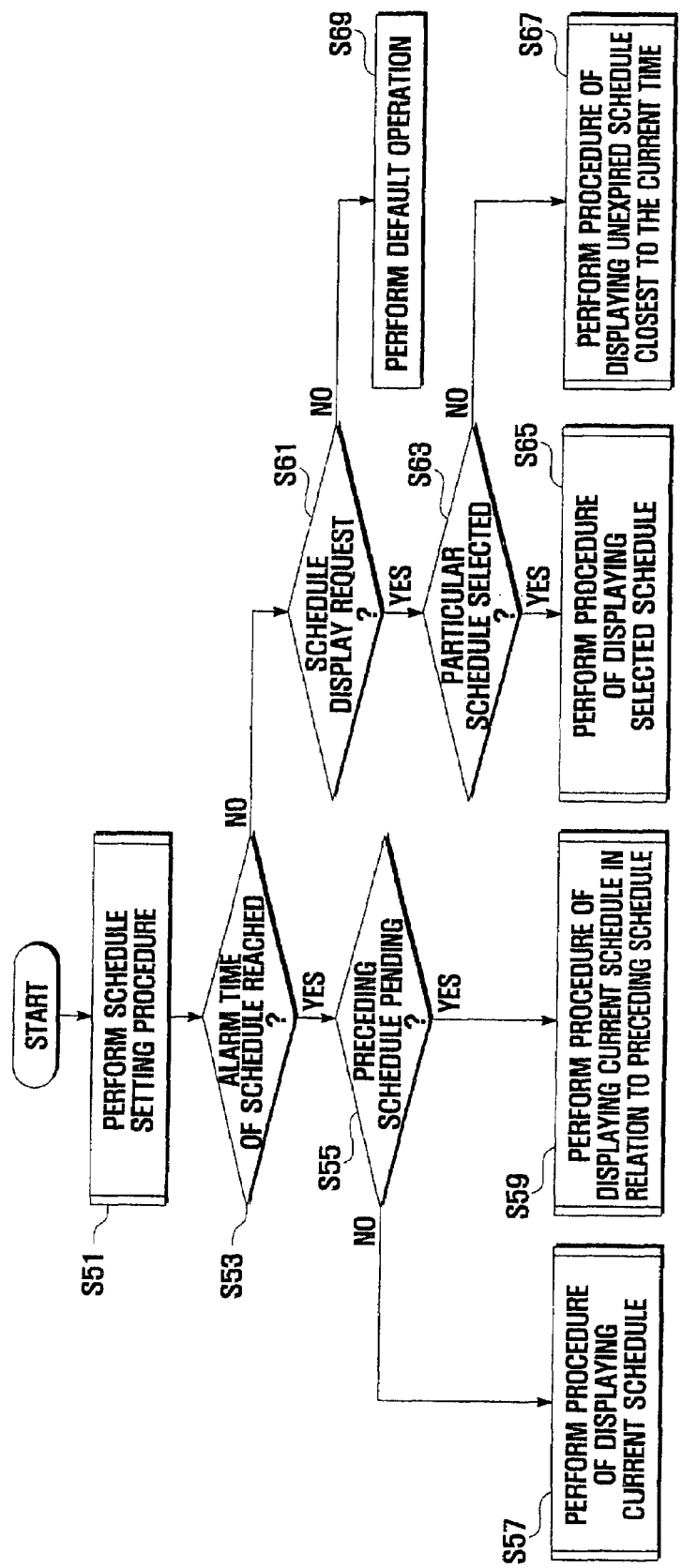
FIG. 2 is a flow chart illustrating the basic steps of a schedule management method using a mobile terminal according to another exemplary embodiment of the present invention.

FIG. 2 is a flow chart illustrating a schedule management method using a mobile terminal according to another exemplary embodiment of the present invention.

Referring to FIGS. 1 and 2, at step S51, the control unit 11 performs a schedule setting procedure according to a user request.

At step S53, the control unit 11 determines whether a schedule whose alarm time has reached is present. At step S55, if a schedule whose alarm time has been reached (referred to as a current schedule) is present, the control unit 11 determines whether a preceding schedule is pending between the alarm time and the planned event time of the current schedule. If a preceding schedule is not pending, the control unit 11 performs a procedure of displaying the current schedule (step S57). If a preceding schedule is pending, then at step S59, the control unit 11 performs a procedure of displaying the current schedule in relation to the preceding schedule.

Referring back to step S53, if a schedule whose alarm time has been reached is not present, the control unit 11 determines at step S61 whether a schedule display request is issued by the user through a key input. If a schedule display request is input, the control unit 11 determines at step S63 whether a particular schedule has been selected by the user. If a schedule has been selected by the user, at step S65 the control unit 11 performs a procedure of displaying the selected schedule. If a schedule is not selected by the user, at step S67 the control unit 11 performs a procedure of displaying an unexpired schedule whose planned event time is closest to the current time.

Referring back to step S61, if no schedule display request is input, then at step S69 the control unit 11 performs a default operation.

Figure 3:
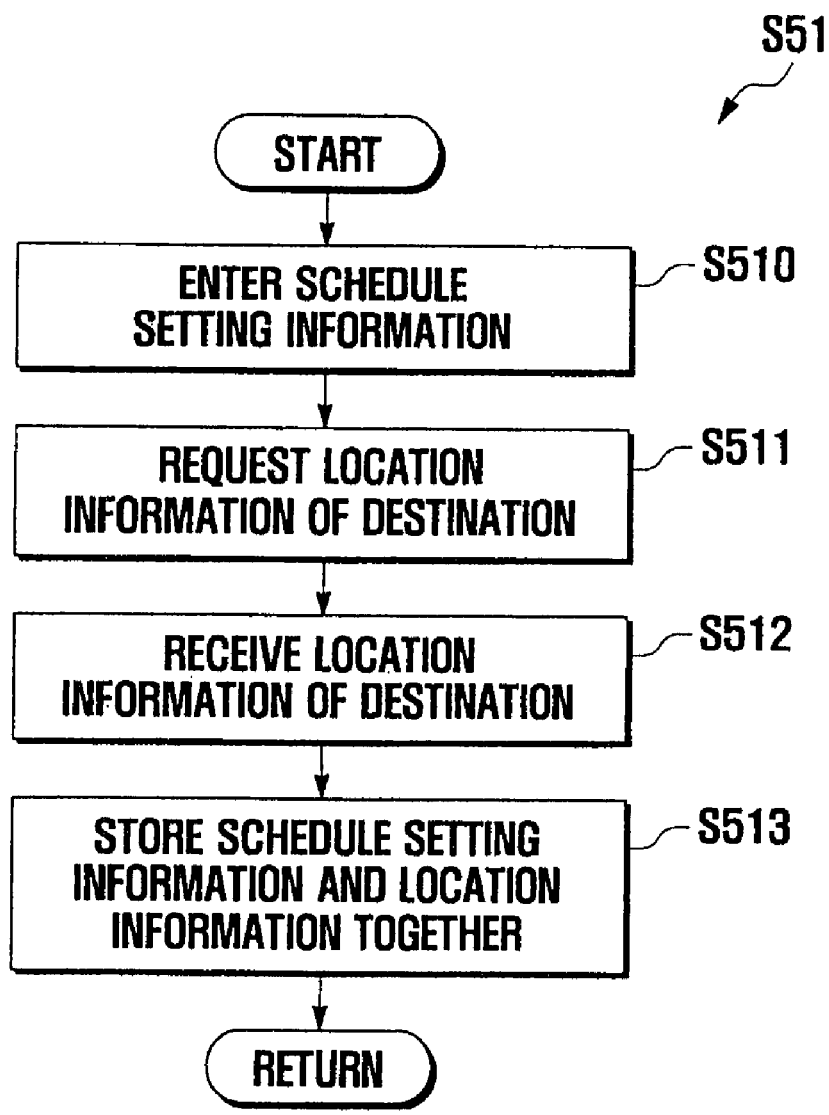
FIG. 3 is a flow chart illustrating a schedule setting procedure in the exemplary method steps shown in FIG. 2.

FIG. 3 is a flow chart illustrating the details of an example of a schedule setting procedure (step S51 in the method of FIG. 2).

Referring to FIGS. 1 and 3, the user inputs a schedule (step S510). At step S510, the control unit 11 displays a schedule setting window in response to selection of a schedule setting menu. Using the schedule setting window, the user enters schedule setting information including an alarm time, alarm means, planned event time, planned event, destination, and transportation means through an input unit, such as, for example, the key input unit 12. The transportation means can be one of walking, car, train, subway, bicycle, and motor cycle and/or alternatives, for comparative purposes; for example, by car and by train.

Thereafter, at step S511, the control unit 11 controls the wireless unit 15 to connect to the traffic information server 30 through the IP network 20, and to request location information of the destination. The traffic information server 30 retrieves the requested location information through map searching, and sends the retrieved location information to the mobile terminal 10.

Still referring to FIGS. 1 and 3, at step S512 the control unit 11 then controls the wireless unit 15 to receive the location information from the traffic information server 30 through the IP network 20.

At step S513, the control unit 11 stores (typically in the memory unit 13) the schedule setting information and received location information of the destination together as an integrated schedule. Average speed data of the transportation means is also stored.

Figure 4:
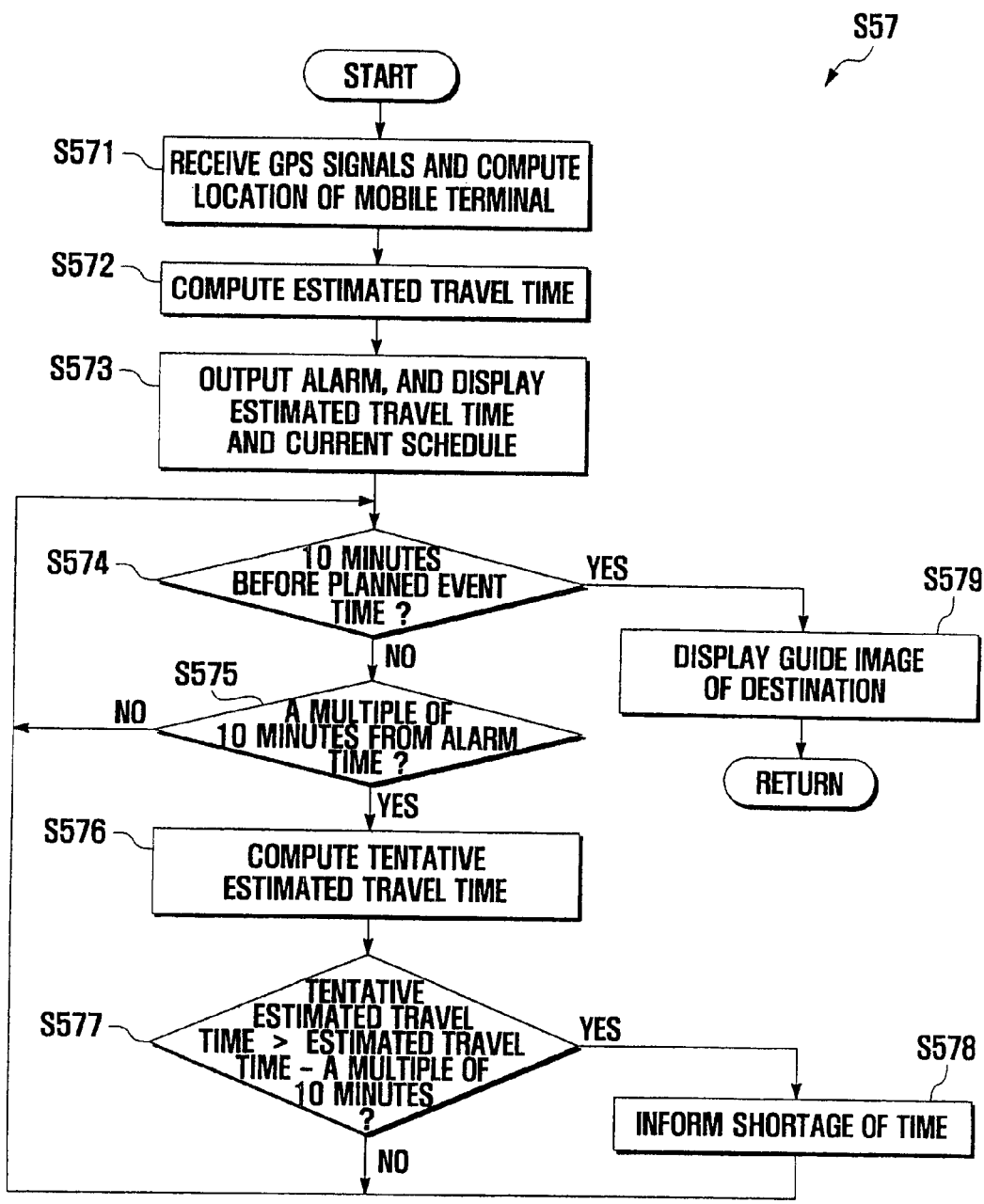
FIG. 4 is a flow chart illustrating a procedure to display the current schedule in the exemplary method shown in FIG. 2.

FIG. 4 is a flow chart illustrating exemplary details of a procedure to display the current schedule (step S57 in the method of FIG. 2).

Referring to FIGS. 1 and 4, at step A571, the control unit 11 controls the GPS module 17 to receive GPS signals from the GPS satellites 40, and to compute the current location of the mobile terminal 10.

At step S572, the control unit 11 computes an estimated travel time from the current location of the mobile terminal 10 to the destination of the current schedule. In addition, an example of one way the estimated travel time can be computed is as follows. The control unit 11 first calculates a distance from the current location of the mobile terminal 10 to the destination of the current schedule using location information, then divides the calculated distance by the average speed of the transportation means of the current schedule. Alternatively, the control unit 11 sends the current location data of the mobile terminal 10 and the destination data of the current schedule to the traffic information server 30. The traffic information server 30 computes a distance between the current location of the mobile terminal 10 and the destination of the current schedule using map information, and sends the computed distance to the mobile terminal 10. The control unit 11 divides the received distance by the average speed of the transportation means to produce the estimated travel time.

At step S573, the control unit 11 outputs an alarm to the speaker SPK, and controls the display unit 14 to display the estimated travel time and the current schedule. That is, the display unit 14 displays the current time, estimated travel time, remaining time to the planned event time, and planned event of the current schedule.

At step S574, the control unit 11 determines, at a time after the alarm time of the current schedule, whether the current time has reached 10 minutes (10 minutes selected for explanatory purposes) before the planned event time. If the current time has not reached 10 minutes before the planned event time, then at step S575 the control unit 11 determines whether the current time has reached a time corresponding to a multiple of 10 minutes (10*n, n: natural number) from the alarm time. If the current time has reached a time corresponding to a multiple of 10 minutes from the alarm time, then at step S576 the control unit 11 computes a tentative estimated travel time from the current location of the mobile terminal 10 to the destination of the current schedule. Computation of the tentative estimated travel time can be performed in a manner identical to that of the estimated travel time. At step S577, the control unit 11 determines whether the tentative estimated travel time is greater than the difference between the estimated travel time and the time corresponding to a multiple of 10 minutes. If the tentative estimated travel time is greater than the difference, then at step S578 the control unit 11 informs the user of a shortage of time. That is, the control unit 11 outputs an alarm to the speaker SPK, and controls the display unit 14 to display the current time, planned event, and the remaining time to the planned event time against the estimated travel time, thereby guiding the user to keep on the schedule.

Referring back to step S575, if the current time has not reached a time corresponding to a multiple of 10 minutes from the alarm time, and if the tentative estimated travel time is greater than the difference at step S577, the control unit 11 repeats step S574 and subsequent steps.

Referring back to step S574, if the current time has reached 10 minutes before the planned event time, then at step S579 the control unit 11 controls the display unit 14 to display a guide image of the destination of the current schedule. In other words, the control unit 11 sends a request for a guide image of the destination to the traffic information server 30. In return, the traffic information server 30 retrieves a guide image of the destination, and sends the retrieved guide image to the mobile terminal 10. The control unit 11 displays the guide image of the destination through the display unit 14, and outputs an alarm to the speaker SPK to inform the user of guide image display. Hence, the mobile terminal 10 can facilitate finding the destination through guide image display. The control unit 11 may further display the current time and the remaining time to the planned event. Note that the guide image may include guided directions such as in GPS units in vehicles with verbal or visual cues (e.g. turn right at Main street), or a physical image of the destination such as a photo of a building (there are photomaps being made of some major cities in this fashion) or a combination thereof.

Figure 5:
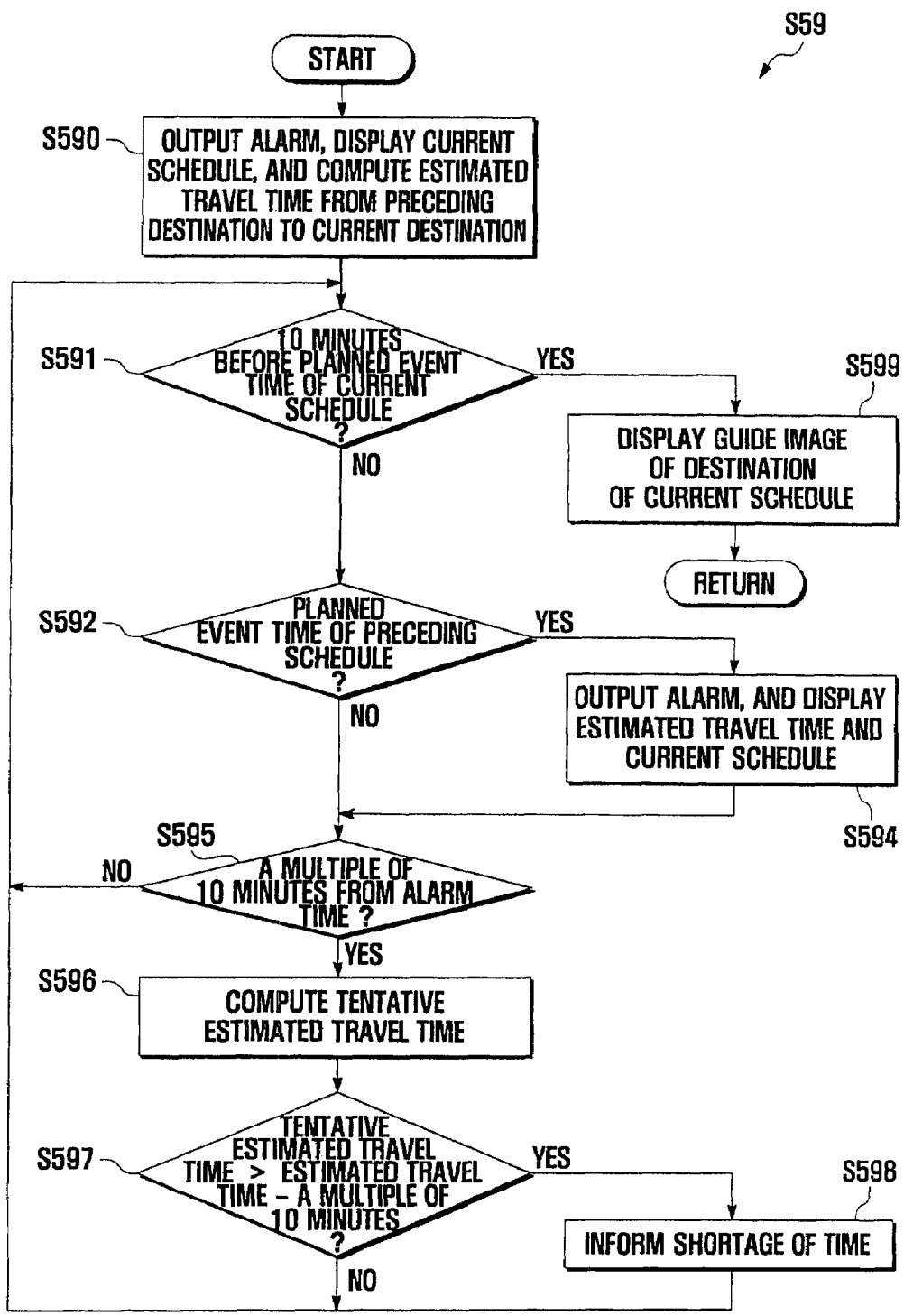
FIG. 5 is a flow chart illustrating a procedure to display the current schedule in relation to the preceding schedule in the method of FIG. 2.

FIG. 5 is a flow chart illustrating an example of one way of a procedure to display the current schedule in relation to the preceding schedule (step S59 in the method of FIG. 2).

Referring to FIGS. 1 and 5, at step S590 the control unit 11 outputs an alarm to the speaker SPK, controls the display unit 14 to display the current schedule, and computes an estimated travel time from the destination of the preceding schedule to the destination of the current schedule.

At step S591, the control unit 11 determines, at a time after the alarm time of the current schedule, whether the current time has reached 10 minutes before the planned event time of the current schedule. If the current time has not reached 10 minutes before the planned event time of the current schedule, then at step S592 the control unit 11 determines whether the current time has reached the planned event time of the preceding schedule. If the current time has reached the planned event time of the preceding schedule, then at step S594 the control unit 11 outputs an alarm to the speaker SPK, and controls the display unit 14 to display the estimated travel time and the current schedule. That is to say, the display unit 14 displays the current time, and the estimated travel time, remaining time to the planned event time, and planned event of the current schedule.

Thereafter, at step S595 the control unit 11 determines whether the current time has reached a time corresponding to a multiple of 10 minutes (10*n, n: natural number) from the alarm time. If the current time has reached a time corresponding to a multiple of 10 minutes from the alarm time, then at step S596 the control unit 11 computes a tentative estimated travel time from the current location of the mobile terminal 10 to the destination of the current schedule.

At step S597, the control unit 11 determines whether the tentative estimated travel time is greater than the difference between the estimated travel time and the time corresponding to a multiple of 10 minutes. If the tentative estimated travel time is greater than the difference, at step S598 the control unit 11 informs the user of a shortage of time.

Referring back to step S595, if the current time has not reached a time corresponding to a multiple of 10 minutes from the alarm time at step, and if at step S597 the tentative estimated travel time is greater than the difference, the control unit 11 repeats step S591 and subsequent steps.

Referring back to step S591, if the current time has reached 10 minutes before the planned event time, then at step S599 the control unit 11 controls the display unit 14 to display a guide image of the destination of the current schedule.

Figure 6:
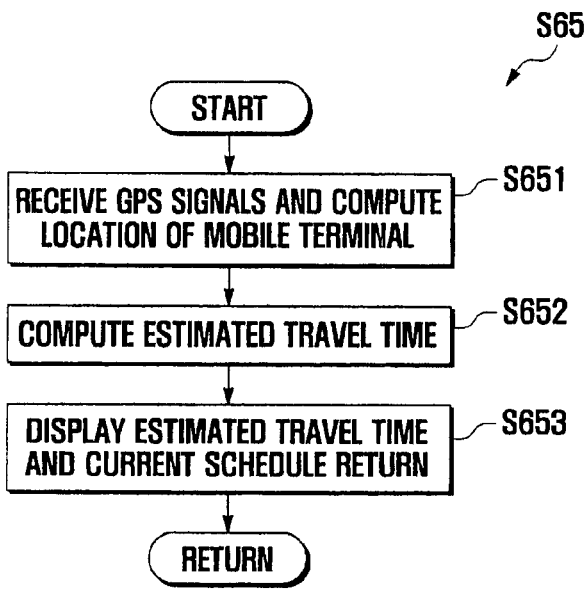
FIG. 6 is a flow chart illustrating a procedure to display a selected schedule in the exemplary method shown in FIG. 2.

FIG. 6 is a flow chart illustrating an example of a procedure to display a selected schedule (step S65 in the method of FIG. 2).

Referring to FIGS. 1 and 6, at step S651 the control unit 11 controls the GPS module 17 to receive GPS signals from the GPS satellites 40, and to compute the current location of the mobile terminal 10.

At step S652, the control unit 11 computes an estimated travel time from the current location of the mobile terminal 10 to the destination of the selected schedule.

At step S563, the control unit 11 controls the display unit 14 to display the estimated travel time and the selected schedule. That is, the display unit 14 displays the current time, and the estimated travel time, remaining time to the planned event time, and planned event of the selected schedule.

Figure 7:
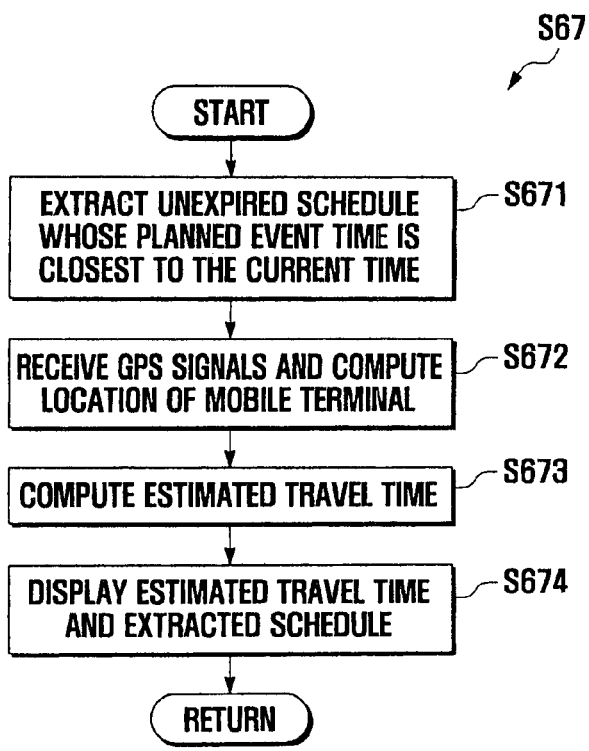
FIG. 7 is a flow chart illustrating a procedure to display an unexpired schedule closest in time in the exemplary method shown in FIG. 2.

FIG. 7 is a flow chart illustrating an example of a procedure to display an unexpired schedule closest in time (step S67 in the method of FIG. 2).

Referring to FIGS. 1 and 7, at step S671 the control unit 11 extracts an unexpired schedule whose planned event time is closest to the current time from the memory unit 13. At step S672, the control unit 11 controls the GPS module 17 to receive GPS signals from the GPS satellites 40, and to compute the current location of the mobile terminal 10. At step S673, the control unit 11 computes an estimated travel time from the current location of the mobile terminal 10 to the destination of the extracted schedule. The control unit 11 controls the display unit 14 to display the estimated travel time and the extracted schedule (step S674). In other words, the display unit 14 displays the current time, and the estimated travel time, remaining time to the planned event time, and planned event of the extracted schedule.

As apparent from the above description, the present invention provides a mobile terminal and schedule management method using the same wherein a schedule management function is integrated with location and traffic information to provide effective schedule guidance to the user. At an alarm time of the current schedule, an estimated travel time from the current location of the mobile terminal to the destination of the current schedule in consideration of a transportation means is displayed. From the alarm time to the planned event time of the current schedule, an estimated travel time from the current location of the mobile terminal to the destination of the current schedule is provided at regular time intervals and an alarm indicating a shortage of time is issued if necessary. At a preset time before the planned event time of the current schedule, a guide image of the destination of the current schedule is displayed. When a preceding schedule is pending between the alarm time and the planned event time of the current schedule, a second estimated travel time from the destination of the preceding schedule to the destination of the current schedule is displayed. Thereby, effective schedule guidance is provided to the user.

While exemplary embodiments of the present invention have been shown and described in this specification, it will be understood by those skilled in the art that various changes or modifications of the embodiments are possible, in addition to those previously discussed above, without departing from the spirit and scope of the invention as defined by the appended claims. For example, if schedules are set in order of planned event times in the schedule setting procedure, whether a preceding schedule is pending between the alarm time and the planned event time of the current schedule can be determined in the schedule setting procedure. If a preceding schedule is pending, an estimated travel time from the destination of the preceding schedule to the destination of the current schedule can be computed and stored for later use. Also, a mobile terminal is not the only device in which the present invention can be practiced, and the estimated travel time does not have to be calculated by the mobile terminal but could be received from the traffic information server or another server and provided for display.

What is claimed is:

1. A schedule management method for use in a mobile terminal, comprising:
   (a) inputting a current schedule that includes one or more of an alarm time, planned event time, planned event, destination, and indicator of a transportation means by which a user travels to a destination of the current schedule;
   (b) receiving location information of the input destination of the schedule input in step (a) from a map search feature;
   (c) determining, at an alarm time of the current schedule of the schedules input in step (a), a current location of the mobile terminal using global positioning system (GPS) satellite signals;
   (d) providing a first estimated travel time from the current location of the mobile terminal to a destination of the current schedule by calculating a distance from the current location of the mobile terminal to the destination of the current schedule, and dividing the calculated distance by an average speed of a transportation means for the current schedule; and
   (e) outputting an alarm, and displaying the first estimated travel time in step (d) and the current schedule in step (a).

2. The schedule management method recited in claim 1, wherein in step (d) the estimated travel time is provided to a memory unit of the mobile terminal.

3. The schedule management method of claim 1, wherein the providing of the first estimated travel time in step (d) comprises:
   receiving a distance between the current location of the mobile terminal and the destination of the current schedule, obtained from the map search feature; and
   dividing the received distance by an average speed of a transportation means for the current schedule.

4. The schedule management method of claim 3, wherein the transportation means is one of walking, car, train, subway, bicycle, and motor cycle.

5. The schedule management method of claim 4, further comprising:
   repeatedly computing a tentative estimated travel time between the current location of the mobile terminal and the destination of the current schedule at regular time intervals from the alarm time to the planned event time of the current schedule; and
   issuing an alarm when the tentative estimated travel time is greater than the difference between the first estimated travel time and a preset time duration.

6. The schedule management method of claim 5, wherein the repeated computing of a tentative estimated travel time between the current location of the mobile terminal and the destination of the current schedule is performed at one of a traffic information server or another server in communication with the mobile terminal.

7. The schedule management method of claim 5, further comprising displaying, at a preset time before the planned event time of the current schedule, a guide image of the destination of the current schedule.

8. The schedule management method of claim 7, wherein the guide image is received from a traffic information server.

9. The schedule management method of claim 1, further comprising:
   determining, at the alarm time of the current schedule, whether a preceding schedule is pending between the alarm time and a planned event time of the current schedule;
   computing a second estimated travel time from a destination of the preceding schedule to the destination of the current schedule when a preceding schedule is pending; and
   outputting an alarm, and displaying the computed second estimated travel time and the current schedule.

10. The schedule management method of claim 9, wherein the second estimated travel time is displayed at a planned event time of the preceding schedule at or after the alarm time.

11. The schedule management method of claim 1, further comprising:
   inputting the schedule comprises selecting one of input schedules in step (a);
   computing a current location of the mobile terminal using GPS satellite signals;
   computing a third estimated travel time from the current location of the mobile terminal to a destination of the selected schedule; and
   displaying the computed third estimated travel time and the selected schedule.

12. The schedule management method of claim 1, further comprising:
   extracting, in response to a schedule display request, an unexpired schedule whose planned event time is closest to the current time;
   computing a current location of the mobile terminal using GPS satellite signals;

computing a fourth estimated travel time from the current location of the mobile terminal to a destination of the extracted schedule; and displaying the computed fourth estimated travel time and the extracted schedule.

13. A schedule management method using a mobile terminal, comprising:

setting, by a controller, a schedule including an alarm time, planned event time, planned event and destination;

receiving, by a GPS module, location information of a destination of the schedule through a map search feature;

determining, by the controller at an alarm time of a current schedule, whether a preceding schedule is pending between the alarm time and a planned event time of the current schedule;

computing, by the controller, an estimated travel time from a destination of the preceding schedule to a destination of the current schedule when preceding schedule is pending;

outputting an alarm, by an audio processor, and display unit the computed estimated travel time and the current schedule at a planned event time of the preceding schedule at or after the alarm time of the current schedule;

repeatedly computing, by the controller, a tentative estimated travel time between the current location of the mobile terminal and the destination of the current schedule at regular time intervals from the alarm time to the planned event time of the current schedule; and issuing an alarm, by the audio processor, when the tentative estimated travel time is greater than the difference between the estimated travel time and a preset time duration, an alarm.

14. The schedule management method of claim 13, further comprising displaying, by the display unit, at a preset time before the planned event time of the current schedule, a guide image of the destination of the current schedule.

15. The schedule management method of claim 14, wherein the guide image is received from a traffic information server.

16. A mobile terminal comprising:

an input unit for inputting a schedule composed of an alarm time, planned event time, planned event, destination, and transportation means;

a wireless unit for receiving location information of a destination of a schedule from a map search feature;

a global positioning system (GPS) module for receiving GPS satellite signals to compute a current location of the mobile terminal at an alarm time of a current schedule;

a control unit for computing a first estimated travel time from the current location of the mobile terminal to a destination of the current schedule and for calculating a second estimated travel time from a destination of the preceding schedule to the destination of the current schedule when the preceding schedule is pending between the alarm time and the planned event time of the current schedule;

a display unit for displaying the computed first and second estimated travel time and the current schedule; and an alarm unit for producing an alarm at an alarm time of a schedule.

17. The mobile terminal of claim 16, wherein the control unit repeatedly computes a tentative estimated travel time between a current location of the mobile terminal and the destination of the current schedule at regular time intervals from the alarm time to the planned event time of the current schedule, and outputs an alarm to the alarm unit when the tentative estimated travel time is greater than the difference between the first or second estimated travel time and a preset time duration.

18. The mobile terminal of claim 17, wherein the control unit displays a guide image of the destination of the current schedule at a preset time before the planned event time of the current schedule.

19. The mobile terminal of claim 18, wherein the first estimated travel time and second estimated travel time are a time value obtained through dividing a distance between the current location of the mobile terminal and the destination of the current schedule by an average speed of a transportation means for the current schedule.

* * * * *

UNITED STATES PATENT AND TRADEMARK OFFICE
CERTIFICATE OF CORRECTION

| | | |
|---|---|---|
| PATENT NO. | : 8,014,794 B2 | Page 1 of 1 |
| APPLICATION NO. | : 11/986123 | |
| DATED | : September 6, 2011 | |
| INVENTOR(S) | : Jae Young Huh et al. | |

It is certified that error appears in the above-identified patent and that said Letters Patent is hereby corrected as shown below:

Column 11, Claim 13, Lines 22-23 should read as follows:
--...and displaying by a display unit...--

Signed and Sealed this
Twenty-fourth Day of April, 2012

David J. Kappos
*Director of the United States Patent and Trademark Office*